US012622370B2

(12) United States Patent
Loppnow et al.

(10) Patent No.: US 12,622,370 B2
(45) Date of Patent: May 12, 2026

(54) SMART SPRINKLER SYSTEM

(71) Applicant: Textron Inc., Providence, RI (US)

(72) Inventors: Payton Michael Loppnow, Augusta, GA (US); Brian David Wanta, North Augusta, SC (US); Cole Elliot O'Brien, North Augusta, SC (US)

(73) Assignee: TEXTRON INC., Providence, RI (US)

( * ) Notice: Subject to any disclaimer, the term of this patent is extended or adjusted under 35 U.S.C. 154(b) by 73 days.

(21) Appl. No.: 18/816,111

(22) Filed: Aug. 27, 2024

(65) Prior Publication Data

US 2026/0060187 A1 Mar. 5, 2026

(51) Int. Cl.
| | |
|---|---|
| *A01G 25/16* | (2006.01) |
| *A01G 25/02* | (2006.01) |
| *A01D 34/00* | (2006.01) |
| *A01D 101/00* | (2006.01) |

(52) U.S. Cl.
CPC ........... *A01G 25/167* (2013.01); *A01G 25/02* (2013.01); *A01D 34/008* (2013.01); *A01D 2101/00* (2013.01)

(58) Field of Classification Search
CPC ...... A01G 25/167; A01G 25/02; A01G 25/16; A01D 34/008
See application file for complete search history.

(56) References Cited

U.S. PATENT DOCUMENTS

| | | | | |
|---|---|---|---|---|
| 3,599,867 | A | * | 8/1971 | Griswold ............. A01G 25/162 239/DIG. 15 |
| 5,479,339 | A | | 12/1995 | Miller |

| | | | | |
|---|---|---|---|---|
| 5,696,671 | A | | 12/1997 | Oliver |
| 5,839,660 | A | | 11/1998 | Morgenstern et al. |
| 5,870,302 | A | | 2/1999 | Oliver |
| 6,145,755 | A | | 11/2000 | Feltz |
| 6,892,113 | B1 | | 5/2005 | Addink et al. |
| 7,243,459 | B2 | * | 7/2007 | Kaprielian ............. A01G 13/28 47/1.01 R |
| 7,930,069 | B2 | | 4/2011 | Savelle et al. |
| 8,219,254 | B2 | | 7/2012 | O'Connor |
| 8,366,017 | B1 | | 2/2013 | Campbell et al. |
| 8,538,592 | B2 | | 9/2013 | Alexanian |
| 8,620,480 | B2 | | 12/2013 | Alexanian |
| 8,682,493 | B1 | | 3/2014 | Campbell et al. |
| 8,751,052 | B1 | | 6/2014 | Campbell et al. |

(Continued)

FOREIGN PATENT DOCUMENTS

WO     WO-2024/077404 A1     4/2024

OTHER PUBLICATIONS

Toro, Spatial Adjust, taken from https://cdn.thetorocompany.com/api/assetstorage/623_97c0068d-4e23-4315-8d0d-517e14df647b, accessed Jan. 6, 2026, 24 pages.

(Continued)

*Primary Examiner* — Monica L Perry
(74) *Attorney, Agent, or Firm* — Foley & Lardner LLP

(57) ABSTRACT

An irrigation system includes at least one sensor configured to acquire data regarding a water saturation level of an area of soil, a sprinkler configured to provide water to the area of soil, and a control system. The control system is configured to acquire the data from the at least one sensor and adjust a watering scheme of the sprinkler based on the data to provide a desired water saturation level to the area of soil.

20 Claims, 10 Drawing Sheets

(56) References Cited

U.S. PATENT DOCUMENTS

| | | | |
|---|---|---|---|
| 8,862,277 | B1 | 10/2014 | Campbell et al. |
| 8,948,921 | B2 | 2/2015 | Halahan et al. |
| 9,144,204 | B2 | 9/2015 | Redmond et al. |
| 9,504,213 | B2 | 11/2016 | Levine et al. |
| 9,756,797 | B2 | 9/2017 | Sarver et al. |
| 9,829,871 | B1 | 11/2017 | Goodman et al. |
| 10,225,997 | B1 | 3/2019 | Levine et al. |
| 10,602,682 | B1 | 3/2020 | Wardle et al. |
| 10,743,483 | B1 | 8/2020 | Melrose |
| 10,743,484 | B2 | 8/2020 | Klein et al. |
| 10,901,438 | B2 | 1/2021 | Klein et al. |
| 11,109,546 | B2 | 9/2021 | Weiler et al. |
| 11,457,576 | B2 | 10/2022 | Huang et al. |
| 11,849,680 | B2 | 12/2023 | Motycka et al. |
| 11,856,901 | B2 | 1/2024 | Lachapelle-Trouillard et al. |
| 2003/0109964 | A1 | 6/2003 | Addink et al. |
| 2005/0187665 | A1 | 8/2005 | Fu |
| 2006/0049271 | A1 | 3/2006 | Hitt |
| 2006/0116791 | A1 | 6/2006 | Ravula et al. |
| 2007/0016334 | A1 | 1/2007 | Smith et al. |
| 2008/0027586 | A1 | 1/2008 | Hern et al. |
| 2008/0097654 | A1 | 4/2008 | Marian |
| 2009/0150002 | A1 | 6/2009 | Fekete |
| 2009/0177330 | A1 | 7/2009 | Kah |
| 2010/0179701 | A1 | 7/2010 | Gilbert et al. |
| 2010/0241279 | A1 | 9/2010 | Samon I Castella et al. |
| 2011/0190947 | A1 | 8/2011 | Savelle et al. |
| 2012/0109387 | A1 | 5/2012 | Martin et al. |
| 2012/0175425 | A1 | 7/2012 | Evers et al. |
| 2012/0290140 | A1 | 11/2012 | Groeneveld |
| 2013/0085619 | A1 | 4/2013 | Howard |
| 2013/0226357 | A1 | 8/2013 | Ersavas et al. |
| 2013/0269798 | A1 | 10/2013 | Wood |
| 2014/0236868 | A1 | 8/2014 | Cook |
| 2014/0263719 | A1 | 9/2014 | Whitson |
| 2015/0005960 | A1 | 1/2015 | Endrizzi et al. |
| 2015/0032274 | A1 | 1/2015 | Runge et al. |
| 2015/0081116 | A1 | 3/2015 | Endrizzi et al. |
| 2015/0100168 | A1 | 4/2015 | Oliver et al. |
| 2015/0115052 | A1 | 4/2015 | Lehmann |
| 2015/0223416 | A1 | 8/2015 | Eng et al. |
| 2015/0272017 | A1 | 10/2015 | Hedley et al. |
| 2016/0198645 | A1 | 7/2016 | Weatherill |
| 2016/0219804 | A1 | 8/2016 | Romney et al. |
| 2016/0259309 | A1 | 9/2016 | Bangalore et al. |
| 2017/0020089 | A1 | 1/2017 | Endrizzi et al. |
| 2017/0248927 | A1 | 8/2017 | Combs |
| 2018/0077882 | A1 | 3/2018 | Gilliam et al. |
| 2018/0080861 | A1* | 3/2018 | Lafian ..................... G01N 7/10 |
| 2018/0307253 | A1 | 10/2018 | Weiler et al. |
| 2019/0307084 | A1 | 10/2019 | Ersavas et al. |
| 2020/0214233 | A1 | 7/2020 | Eng et al. |
| 2020/0344964 | A1 | 11/2020 | Weiler et al. |
| 2021/0127605 | A1 | 5/2021 | Aughton et al. |
| 2022/0394943 | A1 | 12/2022 | Periard Larrivee et al. |
| 2022/0408665 | A1 | 12/2022 | Jackson et al. |
| 2023/0071324 | A1 | 3/2023 | Tsai |
| 2023/0195064 | A1 | 6/2023 | Eyring et al. |

OTHER PUBLICATIONS

Toro, Spatial Adjust, taken from https://www.toro.com/en/product/Spatial-Adjust?srsltid=AfmBOopmEAXTdtehlBr2qyQwpYZgO3gWk5KwNzi8-9zlYISF_Qrq1S4d, accessed Jan. 6, 2026, 2 pages.

Toro, Toro and TerraRad Partner to Lead Groundbreaking Soil Moisture Software for Effortless Precision Irrigation, taken from https://newsroom.toro.com/en/news/2025-US/02-05-25-toro-and-terrarad-partner-on-soil-moisture-software-gcsaa-show, Feb. 5, 2025, 1 page.

Toro, Toro Revolutionizes Golf Course Irrigation with Spatial Adjust Software, taken from https://newsroom.toro.com/en/news/2025-us/11-18-25-toro-revolutionizes-golf-course-irrigation-with-spatial-adjust-software, Nov. 18, 2025, 1 page.

* cited by examiner

SMART SPRINKLER SYSTEM

BACKGROUND

Mowers are used to maintain vegetation (e.g., grass, clover, weeds, etc.) at a desired height. Sprinkler systems are used to provide water to the vegetation. The sprinkler systems are often all controlled based on a singular command turning all of the sprinklers within the sprinkler system on or off. Often, the command is preset to be transmitted to the controllers at a set time regardless of the conditions of the course. Thus, various areas may receive too much or too little water affecting the growth of vegetation and the play of golfers playing on a golf course.

SUMMARY

One embodiment relates to an irrigation system. The irrigation system includes a at least one sensor configured to acquire data regarding a water saturation level of an area of soil, a sprinkler configured to provide water to the area of soil, and a control system. The control system is configured to acquire the data from the at least one sensor and adjust a watering scheme of the sprinkler based on the data to provide a desired water saturation level to the area of soil.

Another embodiment relates to an irrigation system. The irrigation system includes a non-transitory computer-readable medium having instructions stored thereon that, upon execution by one or more processors, cause the one or more processors to acquire first data regarding a water saturation level of an area of soil from at least one sensor, control sprinklers based on the first data to provide a first desired water saturation level to the area of soil, acquire second data regarding the water saturation level of the area of soil from the at least one sensor, and adjust a watering scheme of the sprinklers based on the comparison.

Another embodiment relates to an irrigation system. The irrigation system includes a non-transitory computer-readable medium having instructions stored thereon that, upon execution by one or more processors, cause the one or more processors to acquire a plurality of first signals regarding first water saturation values corresponding to a plurality of areas, generate at least one first command based on the first water saturation values, transmit the at least one first command to at least one sprinkler, acquire a plurality of second signals regarding second water saturation values corresponding to the plurality of areas, compare the second water saturation values to the first water saturation values, generate at least one second command based on the comparison, transmit the at least one second command to the at least one sprinkler, and dynamically generate a graphical user interface based on the first water saturation values and the second water saturation values.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1A:
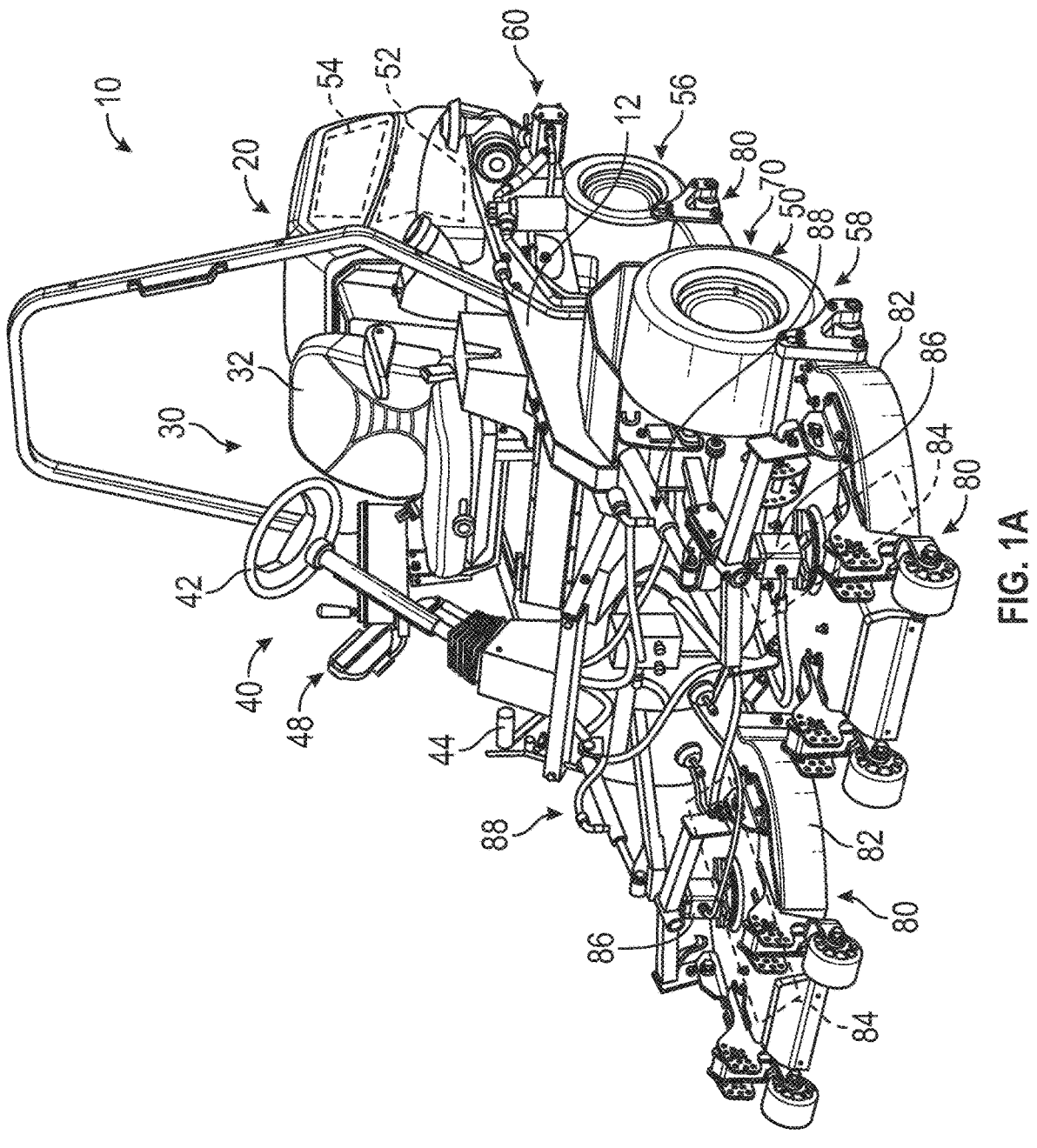
FIG. 1A is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

As shown in FIG. 1A-3, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; a series of implements, mower assemblies, or cutting units, shown as mower decks 80; one or more sensors, shown as sensors 90; and a vehicle control system, shown as vehicle controller 100, coupled to the operator controls 40, the driveline 50, the suspension system 60, the braking system 70, the mower decks 80, and the sensors 90. In other embodiments, the vehicle 10 includes more or fewer components.

Figure 1B:
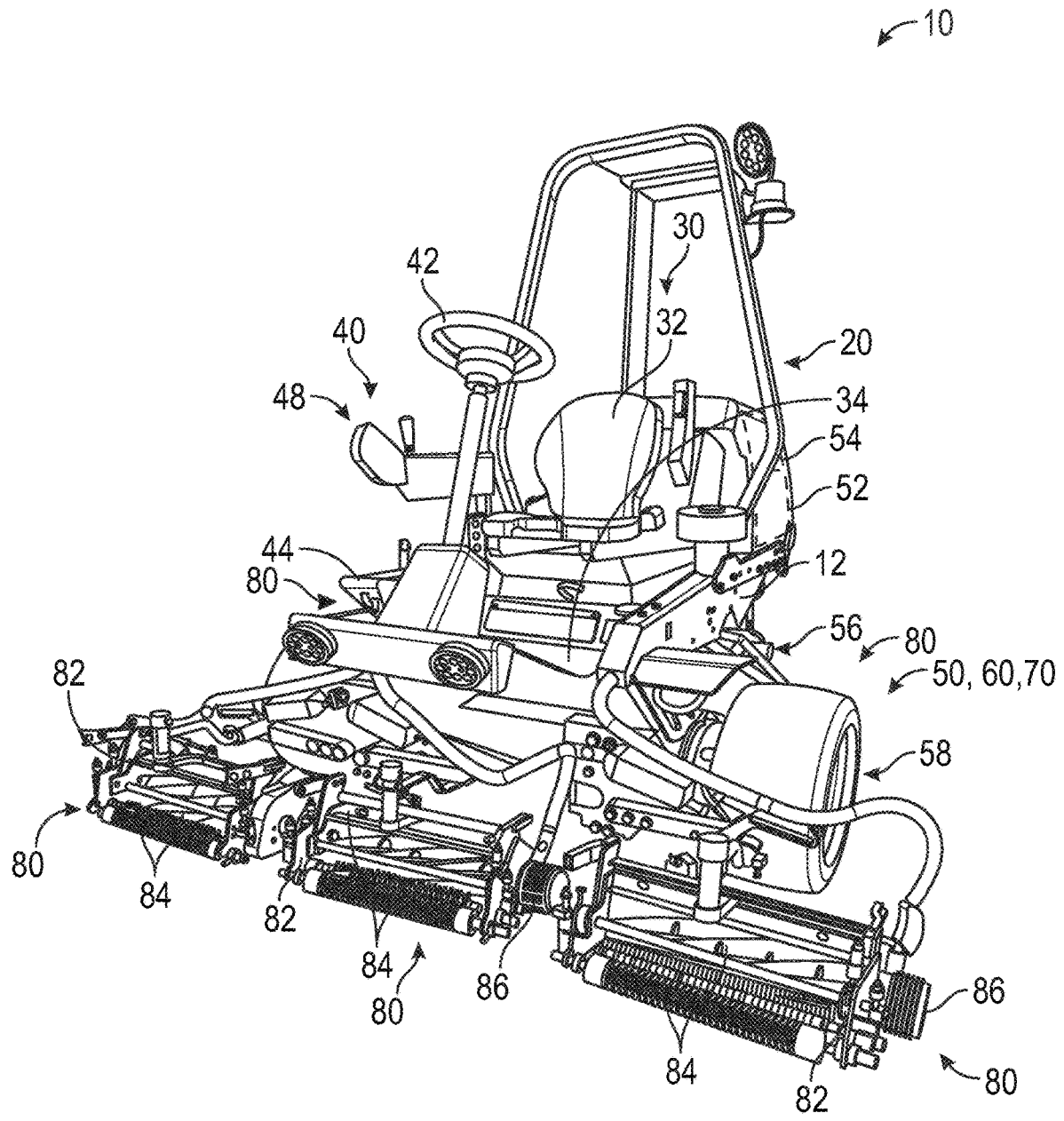
FIG. 1B is a perspective view of a vehicle, according to another exemplary embodiment.

According to an exemplary embodiment, the vehicle 10 is an off-road machine or vehicle. As shown in FIGS. 1A and 1B, the vehicle 10 is configured as a mower (e.g., a lawnmower, a turf mower, a push mower, a ride-on mower, a stand-on mower, or another type of mower). In other embodiments, the off-road machine or vehicle is a lightweight or recreational machine or vehicle such as a golf cart, golf cars, an all-terrain vehicle ("ATV"), a utility task vehicle ("UTV"), and/or another type of lightweight or recreational machine or vehicle. In some embodiments, the off-road machine or vehicle is a chore product such as aerator, turf sprayer, bunker rake, and/or another type of chore product (e.g., that may be used on a golf course).

According to the exemplary embodiments shown in FIGS. 1A and 1B, the occupant seating area 30 includes a single seat, shown as driver seat 32. In some embodiments, the occupant seating area 30 includes additional seats (e.g., a passenger seat, an additional row of seats, etc.). According to the exemplary embodiments shown in FIGS. 1A and 1B, the driver seat 32 is laterally centered on the body 20 and facing forward. In some embodiments, the driver seat 32 is facing rearward or otherwise positioned. In some embodiments, the occupant seating area 30 is omitted (e.g., the vehicle 10 is configured as a push mower). A portion of the frame 12 defines a platform, deck, or standing area, shown as operator platform 34. The operator platform 34 may extend forward of the driver seat 32 such that the occupant can rest their feet on the operator platform 34 while seated in the driver seat 32. The operator platform 34 may support the occupant as the occupant enters or exits the driver seat 32.

Figure 2:
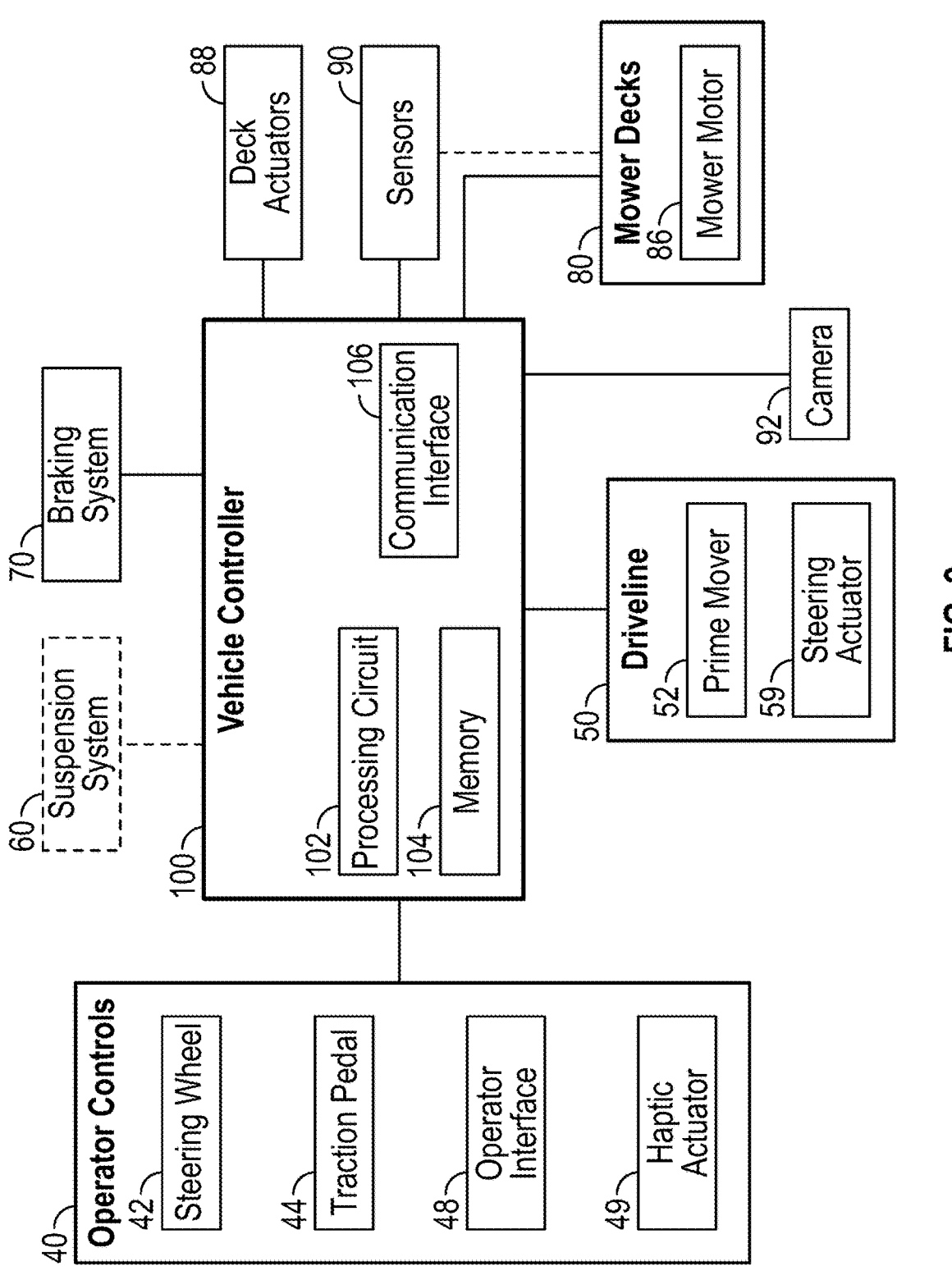
FIG. 2 is a schematic block diagram of the vehicle of FIG. 1A or FIG. 1B, according to an exemplary embodiment.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower a mower deck 80, etc.). As shown in FIGS. 1A, 1B, and 2, the operator controls 40 include a steering interface (e.g., a steering wheel, joystick(s), etc.), shown steering wheel 42, an accelerator interface and/or braking interface (e.g., a pedal, a throttle, etc.), shown as traction pedal 44, and one or more additional interfaces, shown as operator interface 48. The steering wheel 42 may be used by an operator to indicate a desired steering direction of the vehicle 10. The traction pedal 44 may be used to control the speed and direction of travel of the vehicle 10. By way of example, pressing the traction pedal 44 in a first direction may cause the driveline 50 to move the vehicle 10 forward, and pressing the traction pedal 44 in an opposing section direction may cause the driveline 50 to move the vehicle 10 rearward. Returning the traction pedal 44 to a middle or neutral position may cause the braking system 70 and/or the driveline 50 to slow or stop the vehicle 10 or to hold the vehicle 10 in place. Alternatively, the operator interface 48 may include a pair of handles that act as a steering interface and control the driveline 50 in a zero-turn configuration (e.g., a left joystick to control the left side of the driveline 50 and a right joystick to control a right side of the driveline 50). The operator interface 48 may be used to control operation of the mower decks 80 (e.g., changing a cutting speed of a mower deck 80, changing a cutting height of a mower deck 80, etc.). The operator interface 48 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1A, 1B, and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is one or more electric motors and the energy storage 54 is a battery system. In some embodiments, the driveline 50 is a fuel cell electric driveline whereby the prime mover 52 is one or more electric motors and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiments shown in FIGS. 1A and 1B, the rear tractive assembly 56 includes rear tractive elements and the front tractive assembly 58 includes front tractive elements that are configured as wheels. In some embodiments, the rear tractive elements and/or the front tractive elements are configured as tracks. In some embodiments, the driveline 50 is omitted, and the vehicle 10 is propelled by an operator (e.g., the vehicle 10 is configured as a push mower).

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., based on an input from the steering wheel 42 and using a steering actuator 59 that controls the orientation of one or more wheels). In some embodiments, both the rear tractive assembly 56 and the front tractive assembly 58 are fixed and not steerable (e.g., employ skid steer operations). By way of example, the driveline 50 may include a hydrostatic transmission that permits independent driving of the left and right sides of the driveline 50.

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the driveline 50 is a hydrostatic transmission that performs braking by using hydraulic motors to oppose movement of the tractive elements.

Referring to FIGS. 1A and 1B, the vehicle 10 includes a series of mower decks 80 (e.g., cutting units). Each mower deck 80 includes a deck, housing, or enclosure, shown as housing 82, and a cutting element 84 (e.g., a blade, a flail, a reel, etc.) movably coupled to the housing 82. Specifically, the vehicle of FIG. 1A illustrates a vehicle 10 in which the mower decks 80 each include a cutting element 84 configured as a blade that rotates about a substantially vertical axis. FIG. 1B illustrates an alternative configuration in which the cutting elements 84 are configured as reels that each rotate about a substantially horizontal axis. Except as otherwise specified, the mower 10 of FIG. 1A may be substantially similar to the mower 10 of FIG. 1B. Accordingly, a description of the mower 10 of FIG. 1A may apply to the mower 10 of FIG. 1B, except as otherwise specified.

Referring to FIGS. 1A and 1B, the housing 82 may open downward to expose the cutting element 84 to vegetation below the housing 82. A motor or actuator (e.g., an electric motor, a hydraulic motor, etc.), shown as mower motor 86, is coupled to the housing 82 and drives movement (e.g., rotation, oscillation, etc.) of the cutting element 84. While driven by the mower motor 86, the cutting element 84 crushes, mulches, removes, or otherwise trims vegetation beneath the housing 82. Alternatively, the cutting element 84 may be driven by the prime mover 52 (e.g., through a power take off).

The vehicle 10 includes a series of linear actuators or height adjustment actuators, shown as deck actuators 88, each coupled to the frame 12 and to one or more of the mower decks 80. The deck actuators 88 permit control over a height of the corresponding mower deck 80 relative to the frame 12. The deck actuators 88 may set a cutting height of the mower deck 80. The cutting height represents a final height of vegetation that is trimmed by the mower deck 80. The deck actuators 88 may move the mower deck 80 to a travel position above the cutting height, in which the mower deck 80 is moved out of engagement with the vegetation and the ground surface. The travel position may be used when the vehicle 10 is traveling between job sites and/or the user does not wish to be trimming vegetation.

The sensors 90 may include various sensors positioned about the vehicle 10 to acquire vehicle information or vehicle data regarding operation of the vehicle 10, or the location thereof. The sensors 90 may include various sensors positioned about the vehicle 10 to acquire environment data regarding the environment surrounding the vehicle 10. By way of example, the sensors 90 may include an accelerometer, a gyroscope, a compass, a position sensor (e.g., a GPS sensor, an RTK sensor, etc.), an inertial measurement unit ("IMU"), suspension sensor(s), wheel sensors, an audio sensor or microphone, a camera, an optical sensor, a proximity detection sensor, linear potentiometers, and/or other sensors to facilitate acquiring vehicle information, vehicle data, or environment data regarding operation of the vehicle 10, the location thereof, and/or the surrounding environment. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

As shown in FIG. 2, the vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communication interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communication interface 106, a controller area network ("CAN") bus, etc.). According to an exemplary embodiment, the vehicle controller 100 is coupled to (e.g., communicably coupled to) components of the operator controls 40 (e.g., the steering wheel 42, the traction pedal 44, the operator interface 48, etc.), components of the driveline 50 (e.g., the prime mover 52), components of the braking system 70, the mower decks 80, the deck actuators 88, the sensors 90, and a camera 92 (e.g., a camera coupled to the frame 12, the body 20, etc.). By way of example, the vehicle controller 100 may send and receive signals (e.g., control signals, location signals, etc.) with the components of the operator controls 40, the components of the driveline 50, the components of the braking system 70, the sensors 90, the camera 92 and/or remote systems or devices (via the communication interface 106 as described in greater detail herein).

The communication interface 106 facilitate communications (e.g., wired or wireless communications) between the vehicle 10 and other devices (e.g., other vehicles 10, the user sensors 220, a user portal 230, the remote systems 240, etc.). By way of example, the communication interface 106 may be configured to employ one or more types of wireless communications protocols including Bluetooth, Wi-Fi, radio, cellular, and/or other suitable wireless communications protocols.

Site Monitoring and Control System

Figure 3:
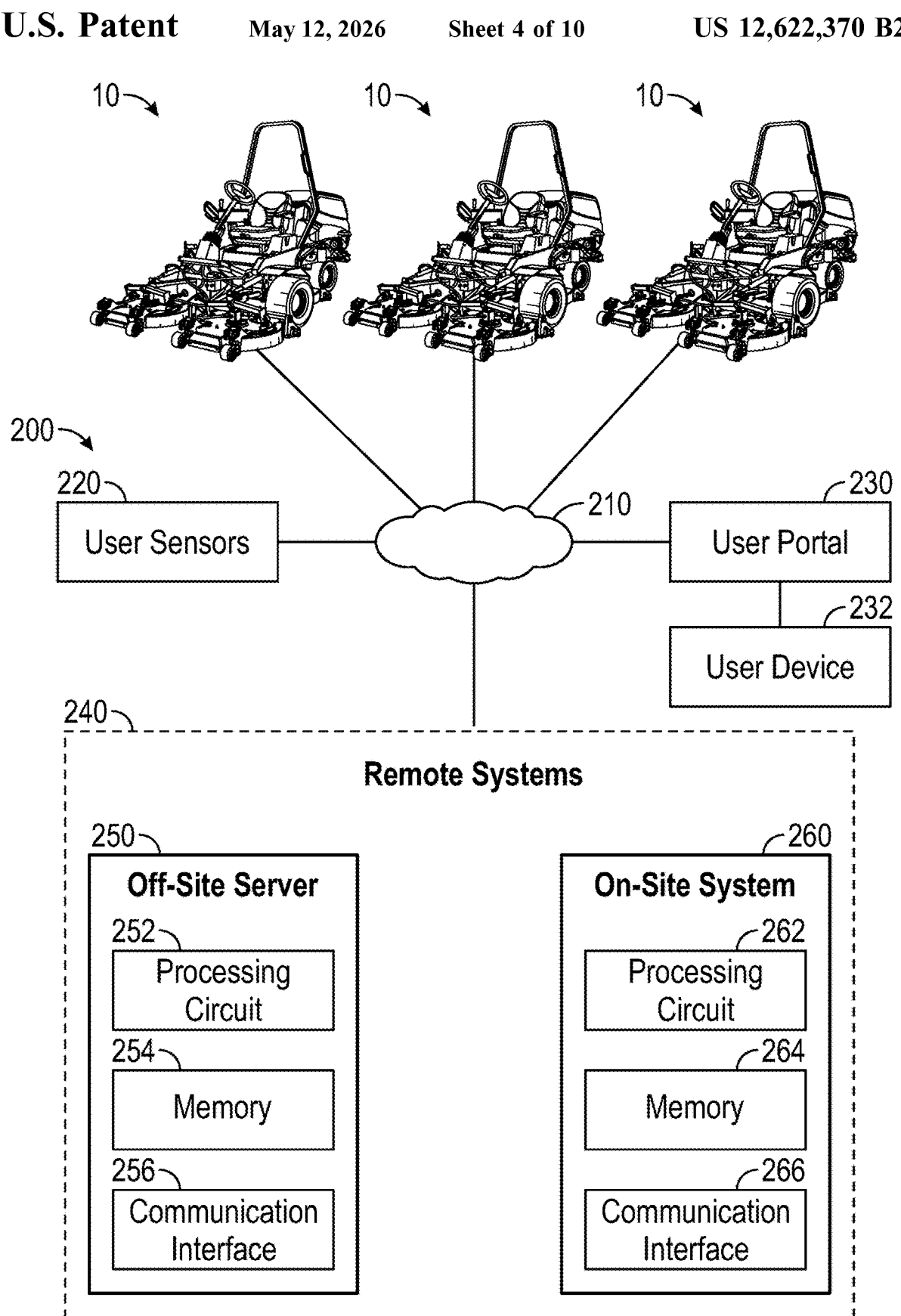
FIG. 3 is a is schematic block diagram of a site monitoring and control system including a plurality of the vehicles of FIG. 1 and an irrigation system, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210 (e.g., using the communication interface 106).

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary). For example, the user sensors 220 may facilitate determining a position of the user (e.g., operator, drier, etc.) by providing a signal to the remote systems 240 and user portal 230.

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like, shown as user device 232. The user portal 230 and the user device 232 communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote systems, shown as off-site server 250, and a second remote systems, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to some embodiments, the remote systems 240 may only send commands to the vehicle 10 if the user sensors 220 are detected near the vehicle 10. For example, the display emulator system may be configured to determine that a user is seated in the driver seat 32 (e.g., determined by a seat sensor, etc.) prior to the remote systems 240 providing the command. In some embodiments, the command is an action, such as lowering the mower deck 80 or adjusting the driveline 50, that can only be performed in response to determining that the user is present (e.g., seated in the driver seat 32, etc.).

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Irrigation System

Figure 4:
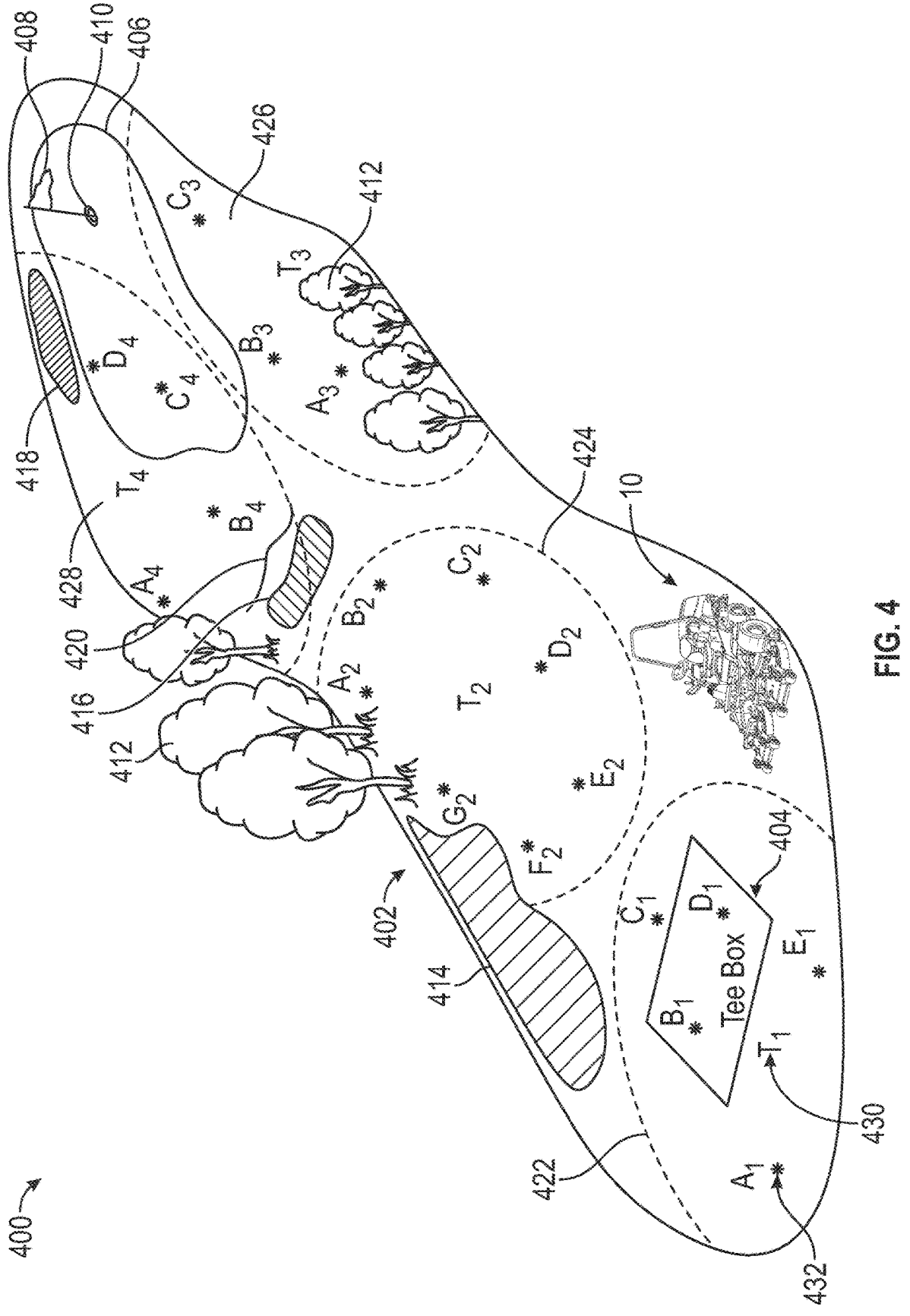
FIG. 4 is an illustration of an irrigation system and a golf course condition reporting system including the vehicle of FIG. 1, according to an exemplary embodiment.

FIG. 4 illustrates a golf hole 400 of a golf course including an irrigation system 402 (e.g., shown as a virtual irrigation system, etc.). The vehicle 10 is shown on the golf hole 400. The illustration of the golf hole 400 and irrigation system 402 may be stored in the remote systems 240 as a virtual golf hole and a virtual irrigation system, respectively. As the golf hole 400 changes, such as a location of a pin, a sand trap, or another obstacle changes (e.g., in real life due to weather, groundskeeper changes, etc.), the virtual golf hole and the virtual irrigation system can be updated to reflect the changes made on the course.

As shown in FIG. 4, the golf hole 400 is illustrated from an aerial view as may be shown on a display (e.g., a user display or remote display, etc.). As shown in FIG. 4, the golf hole 400 includes a tee box 404 and a green 406. The green 406 includes a pin 408 positioned in a hole 410. The pin 408 may include a sensor and or tag that can be tracked by at least one of the vehicle 10, and/or the user device 232, and communicated to the remote systems 240. For example, the precise location of the pin 408 may be updated (e.g., daily, weekly, etc.) and tracked (e.g., saved, etc.) by the user device 232 and/or the remote systems 240. The golf hole 400 also includes a variety of obstacles such as trees 412, sand traps 414, 416, 418, and topographical drop offs 420. The location of the variety of obstacles may be tracked (e.g., changes, etc.) via a user input or a groundskeeper input into the user device 232, sensed data via sensors or cameras on the vehicle 10, etc.

As shown in FIG. 4, the irrigation system 402 includes a plurality of sprinklers (e.g., $T_1$, $T_2$, $T_3$, $T_4$, etc.), shown as sprinklers 430. Each of the sprinklers 430 corresponds to or is associated with a portion (e.g., area, etc.) of the golf hole 400. For example, each of the sprinklers 430 corresponds to an area (e.g., a first area 422, a second area 424, a third area 426, a fourth area 428, etc.) of the golf hole 400. Each sprinkler 430 defines the areas 422, 424, 426, 428 such that the areas 422, 424, 426, 428 correspond to the distance (e.g., circumference, etc.) that each of the sprinklers 430 can provide or spray water to. According to this embodiment, the areas 422, 424, 426, 428 do not overlap. In other embodiments, multiple sprinklers 430 may define areas that overlap such that multiple sprinklers 430 may provide water to a portion of the same area.

As shown in FIG. 4, the irrigation system 402 includes a plurality of sensors (e.g., $A_1$-$E_1$, $A_2$-$G_2$, $A_3$-$C_3$, $A_4$-$D_4$, etc.), shown as sensors 432. The plurality of sensors 432 are configured to acquire data regarding the conditions of the grass and/or soil of the golf hole 400. Each of the sensors 432 corresponds to one of the sprinklers 430 or areas. For example, first sensors $A_1$-$E_1$ of the sensors 432 correspond to a first sprinkler 430 ($T_1$), second sensors $A_2$-$G_2$ of the sensors 432 correspond to a second sprinkler 430 ($T_2$), third sensors $A_3$-$C_3$ of the sensors 432 correspond to a third sprinkler 430 ($T_3$), and fourth sensors $A_4$-$D_4$ correspond to a fourth sprinkler 430 ($T_4$), and so on. In other embodiments, one or more of the sensors 432 may correspond to multiple sprinklers 430. For example, the first sensors $A_1$-$D_1$ of the sensors 432 may correspond to the first sprinkler 430 ($T_1$) and the second sprinkler 430 ($T_2$).

According to an exemplary embodiment, the sensors 432 (e.g., $A_1$-$E_1$, $A_2$-$G_2$, $A_3$-$C_3$, $A_4$-$D_4$, etc.) are or include tensiometers. The tensiometers may be configured to measure the tension of water in the soil around the golf hole 400.

In other embodiments, the sensors 432 may be any type of sensor configured to determine a condition of the golf hole 400. For example, the sensors 432 may be or include hydrostatic pressure sensors.

According to an exemplary embodiment, the sprinklers 430 and the tensiometers 432 create a mesh network with each sprinkler 430 being a node communicably coupled to each of the tensiometers 432 within the area 422, 424, 426, or 428 associated therewith. Each of the sprinklers 430 within a certain area may also communicably coupled to other sprinklers 430 is the certain area such that a singular command (e.g., signal, etc.) can be transmitted to each of the sprinklers 430 and in some embodiments, communicated to each of the tensiometers 432. By way of example, one of the sprinklers 430 may be supervisory or master sprinkler that communicates commands to and/or acquires data from the other sprinklers 430 (e.g., slave sprinklers, etc.).

In some areas, the tensiometers may be randomly dispersed around their corresponding area. As shown in the first area 422, the tensiometers $A_1$-$E_1$ are scattered about the first area 422 such that two tensiometers 432 (e.g., $B_1$, $D_1$, etc.) are positioned in the tee box 404. In other areas, such as the second area 424, the tensiometers 432 ($A_2$-$G_2$) are positioned in a circle around the sprinkler 430 ($T_2$) and are substantially equally distant from adjacent sprinklers 432.

As described in further detail below, the sprinklers 430 may be communicably coupled to the sensors 432 positioned within the same respective area. For example, the first sprinkler 430 ($T_1$) of the first area 422 may be communicably coupled to each sensor 432 ($A_1$-$E_1$) within the first area 422. Each sensor 432 ($A_1$-$E_1$) in the first area 422 is configured to acquire data to facilitate determining a water saturation level of the soil within the first area 422. Each sensor 432 ($A_1$-$E_1$) may acquire the data regarding the water saturation level of the soil after a preset time interval such that a new measurement may be acquired periodically (e.g., every minute, every five minutes, every fifteen minutes, every half hour, every hour, every couple of hours, every day, etc.) or continuously or substantially continuously (e.g., every second, every five seconds, every ten seconds, etc.). As such, a comparison can be made between measured water saturation levels over time (e.g., between first water saturation levels at a first point in time and second water saturation levels, at a second point in time, etc.) and a watering scheme can be adjusted based on the comparison (e.g., sprinklers can be turned on/off, the sprinklers can be rotated and/or repositioned, etc.). The first sprinkler 430 ($T_1$) may be configured to acquire (e.g., receive, request, etc.) the data regarding the water saturation levels from each of the sensors 432 ($A_1$-$E_1$). The first sprinkler 430 ($T_1$) may acquire the data from the sensors 432 ($A_1$-$E_1$) in real time (e.g., via a short range communications protocol such as Bluetooth®, Wi-Fi, etc.) and provide the data to a control system (e.g., a sprinkler controller, the remote systems 240; via a wired connection, via a long range wireless communications protocol such as cellular, radio, etc.; etc.). In some embodiments, the sensors 430 are configured to provide the data directly to the control system. The control system may be configured to adjust a watering scheme of the first sprinkler 430 ($T_1$). For example, if a first sensor 432 ($A_1$) measures a first water saturation level of the first area 122 above a threshold value (e.g., a predetermined value, a value indicating sufficient saturation, etc.) and a fifth sensor 432 ($E_1$) measures a fifth water saturation level of the first area 422 below the threshold value, the watering scheme may be adjusted such that the first sprinkler 430 ($T_1$) provides more water to the portion of the first area 122 near the fifth tensiometer 432 ($E_1$) and less water to the portion of the first area 122 around the first tensiometer 432 ($A_1$). While the above passages have been described in relation to the first area 422, the description thereof similarly applies to the sprinklers 430 and the sensors 432 of the other areas (e.g., the areas 434-438).

According to an exemplary embodiment, operation of the sprinklers 430 (e.g., $T_1$, $T_2$, $T_3$, $T_4$) are controlled (e.g., adjusted, dynamically controlled, etc.) by the control system. The control system may be a sprinkler controller, described in more detail below, the remote systems 240, and/or the vehicle controller 100 of the vehicle 10.

In some embodiments, as the vehicle 10 roams the golf hole 400 (e.g., mowing, surveying, during golfing, during maintenance operations, etc.), the communication interface 106 acquires data (e.g., signals, etc.) from proximate sprinklers 430 and/or sensors 432. The data received from the sprinklers 430 and/or the sensors 432 contains the data regarding water saturation levels of the soil acquired by the sensors 432 of. The communication interface 106 may transmit the data to the user device 232 (e.g., a groundskeeper mobile device, a golf players device, a golf cart display, etc.) and/or the remote systems 240. In such embodiments, the remote systems 240 and/or a user of the user device 232 may adjust the watering scheme of the irrigation system 402 based on the data received from the vehicle 10. In other embodiments, the vehicle controller 100 is configured to adjust the water schemes of each of the sprinklers 430 based on the data acquired by the sensors 432.

As shown in FIG. 4, a plurality of tensiometers may be located on the green 406. For example, the tensiometers may be buried below the surface of the green 406 such that the tensiometers are not seen by the user. The tensiometers located on the green 406 may be flagged or marked as being on the green 406 such that the data collected from the tensiometers located on the green 406 may be used for other reasons than just determining a watering scheme of the sprinklers 430. As shown in FIG. 4, the tensiometers $C_4$ and $D_4$ corresponding to the fourth area 428 are located on the green 406, but any number of tensiometers corresponding to different sprinklers may be located on the green 406. As previously described, and described in more detail below, the tensiometers $C_4$ and $D_4$ located on the green 406 communicate (e.g., measure and provide, etc.) data regarding the water saturation level of the green 406 to the user device 232 and/or the operator interface 48 (e.g., via the vehicle controller 100, via the sprinklers 430, via the remote systems 240), such as a display on a golf cart or mower, and/or at least one of the corresponding sprinkler controller, the vehicle controller 100, the remote systems 240. The vehicle controller 100 and/or the remote systems 240 may be configured to generate a graphical user interface ("GUI") including the water saturation level of the green 406 for display on the user device 232 and/or the operator interface 48 such that a user (e.g., a golfer, a groundskeeper, etc.) can utilize the data regarding the saturation levels of various portions of the green 406 or a value indicative of the water saturation level of the green 406. For example, the generated GUI may include the raw data as well as an interpretation of the data such that the user is informed of the condition of the green 406 so that the user may adjust their swing (e.g., a different path, a harder swing a softer swing, etc.) or club usage based on the conditions. If the generated GUI indicates that, based on the water saturation level determined by the tensiometers, the green 406 is wet and therefore slower than a previous day when the green 406 was drier, the user may adjust their swing to provide more force to the golf ball when putting to accommodate for the elevated wetness.

Irrigation Control System

Figure 5:
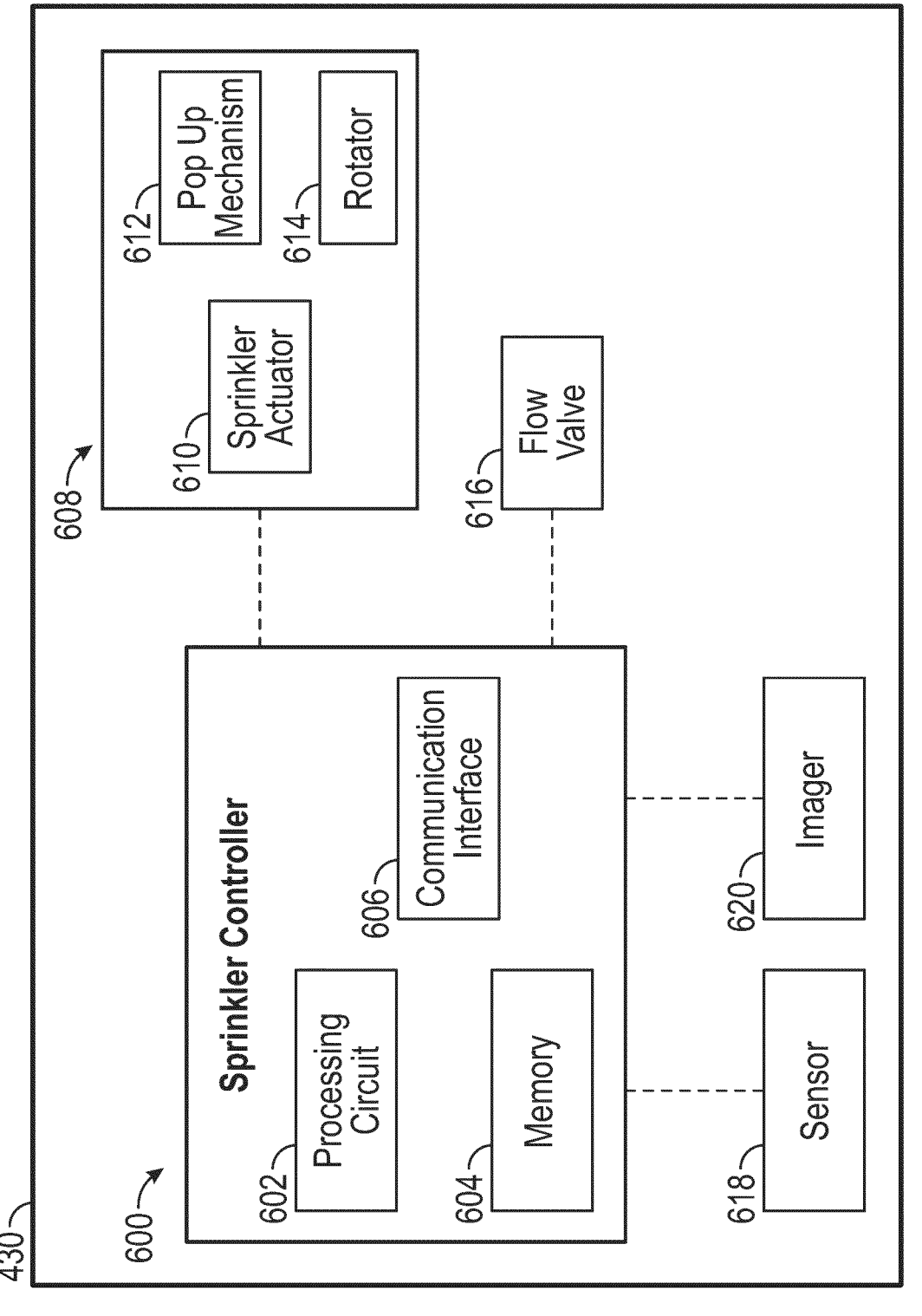
FIG. 5 is a schematic block diagram of a controller of an irrigation system, according to an exemplary embodiment.

Now referring to FIG. 5, a schematic diagram of a sprinkler controller 600 is shown, according to an exemplary embodiment. Each of the sprinklers 430 of FIG. 4 may include the sprinkler controller 600. The sprinkler controller 600 may be implemented as a general-purpose processor, an ASIC, one or more FPGAs, a DSP, circuits containing one or more processing components, circuitry for supporting a microprocessor, a group of processing components, or other suitable electronic processing components.

According to the exemplary embodiment shown in FIG. 5, the sprinkler controller 600 includes a processing circuit 602, a memory 604, and a communication interface 606. The processing circuit 602 may include an ASIC, one or more FPGAs, a DSP, circuits containing one or more processing components, circuitry for supporting a microprocessor, a group of processing components, or other suitable electronic processing components. In some embodiments, the processing circuit 602 is configured to execute computer code stored in the memory 604 to facilitate the activities described herein. The memory 604 may be any volatile or non-volatile or non-transitory computer-readable storage medium capable of storing data or computer code relating to the activities described herein. According to an exemplary embodiment, the memory 604 includes computer code modules (e.g., executable code, object code, source code, script code, machine code, etc.) configured for execution by the processing circuit 602. In some embodiments, the sprinkler controller 600 may represent a collection of processing devices. In such cases, the processing circuit 602 represents the collective processors of the devices, and the memory 604 represents the collective storage devices of the devices.

In one embodiment, the sprinkler controller 600 is configured to selectively engage, selectively disengage, control, or otherwise communicate with components of the sprinkler 430 (e.g., via the communication interface 606, a controller area network ("CAN") bus, etc.). According to an exemplary embodiment, the sprinkler controller 600 is coupled to (e.g., communicably coupled to, etc.) components of sprinkler controls 608 and a flow valve 616. The sprinkler controls 608 include, but is no limited to, a sprinkler actuator 610, a pop-up mechanism 612, and a rotator 614. For example, the sprinkler 430 may receive data from the corresponding sensors 432 (e.g., the first sprinkler 430 ($T_1$) receives data regarding water saturation levels from the tensiometers $A_1$-$E_1$ for the first area 422, etc.), and the processing circuit 602 determines a position adjustment (e.g., a positioning signal, etc.) of the sprinkler 430. The communication interface 606 transmits the position adjustment to the sprinkler controls 608 and the flow valve 616. The sprinkler controls 608 provides the position adjustment signal to each of the sprinkler actuator 610, the pop-up mechanism 612, and the rotator 614. For example, the position adjustment signal may cause the pop-up mechanism 612 to move the sprinkler 430 above the surface of the soil in the area, and then the sprinkler actuator 610 and the rotator 614 move and position the sprinkler 430 to provide water to a desired area. Similarly, the flow valve 616 can modulate (e.g., increase or decrease, etc.) the flow rate of water out of the sprinkler 430 to provide a desired amount of water to the area based on the position adjustment signal and the received water saturation levels of the soil. Is some embodiments, the sprinkler controller 600 communicates with the remote systems 240 and implements commands received from the remote systems 240 (e.g., based on the data acquired from the sensors 432)

In some embodiments, the sprinkler controller 600 is configured to send and receive signals (e.g., control signals, location signals, water saturation level data, etc.) with the vehicle controller 100, the user device 232, or the remote systems 240. For example, the sprinkler controller 600 may receive data regarding the water saturation levels of the soil in the corresponding area from the respective tensiometers, and provide the data to the vehicle controller 100, the user device 232, and/or the remote systems 240. The vehicle controller 100 can then display the data on the operator interface 48 such that an operator can be aware of oversaturated areas and avoid these areas with the vehicle 10. Similarly, the user device 232 may receive the data and generate a display (e.g., a GUI, etc.) including the data such that the user, a golfer, may interpret the data and adjust club usage or swing based on the data (e.g., a virtual caddy, etc.). In another embodiment, the user device 232 may be a groundskeeping device, wherein a groundkeeper receives the data and inputs a manual adjustment to the irrigation system 402 (e.g., an adjustment to the watering scheme, etc.) based on the data. Further the remote systems 240 may receive the data and a remote operator may input a manual adjustment to the irrigation system 402 and/or the remote systems 240 can generate a GUI based on the data and transmit the GUI to the user device 232 (e.g., a device or display on golfcart, a mobile phone, etc.).

Figure 6:
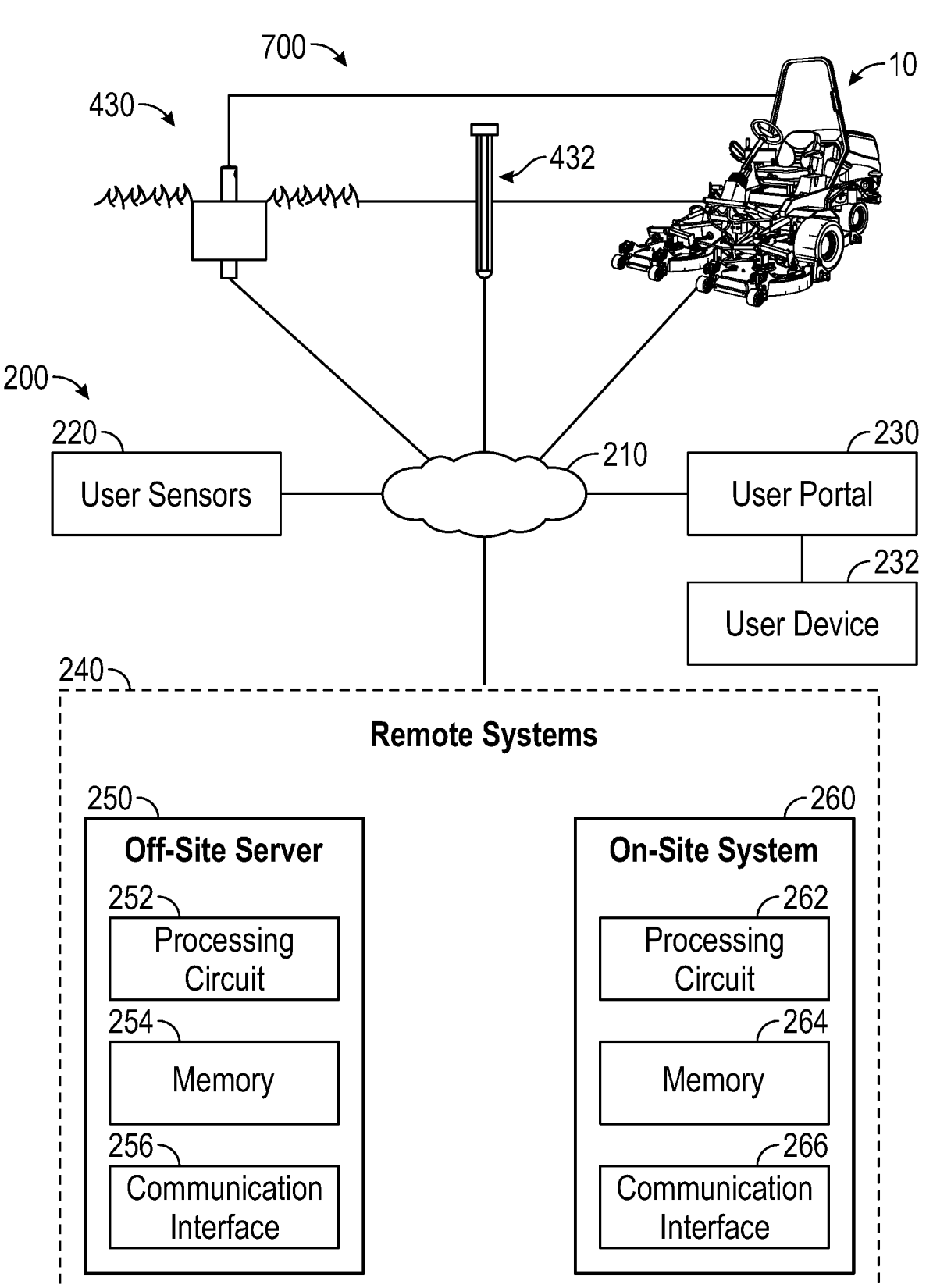
FIG. 6 is a schematic block diagram of a site monitoring and control system including a sprinkler, a sensor, and the vehicles of FIG. 1, according to an exemplary embodiment.

As shown in FIG. 5, the sprinkler controller 600 is communicably coupled to an imager 620 (e.g., a camera, etc.) and a sensor 618. The imager 620 and the sensor 618 are configured to determine a position and a status of the sprinkler 430 (e.g., not in use underground, above the surface and in use, etc.). For example, the sprinkler controller 600 may receive data from the tensiometers and the processing circuit 602 may determine that, based on the data, additional water is needed in the first area 422, and the sprinkler controller 600 may control the sprinkler controls 608 based on a current status of the sprinkler determined by the imager 620 and the sensor 618 so that the sprinkler 430 can provide the desired amount of water to the desired area.
Golf Course Condition Reporting and Control System FIG. 6 is a schematic diagram of a golf course condition reporting system 700. The golf course condition reporting system 700 includes at least one sprinkler 430, at least one sensor 432, and at least one vehicle 10. The vehicle 10 may be any vehicle disclosed herein such as a mower, a golf cart, etc.

The sensor 432 may be directly or indirectly communicably coupled to the sprinkler 430, the vehicle 10, and/or the network 210 and, therefore, the user portal 230, the user device 232, and/or the remote systems 240. The sensor 432 is configured to provide (e.g., communicate, transmit, etc.) the data to the sprinkler 430, the vehicle 10, and/or the network 210 (e.g., and, thereby, the user portal 230, the user device 232, and/or the remote systems 240). As such the sensor 432 may be configured to provide the water saturation level to the sprinkler 430 and/or the network 210 at regular time intervals (e.g., every minute, every hour, every day, etc.). Meanwhile, the sensors 432 may be configured to transmit the data to the vehicle 10 when the vehicle 10 is proximate thereto. For example, the vehicle 10 may drive over or adjacent to the sensor 432 and, as the vehicle 10 drives over or adjacent to the sensor 432, the vehicle controller 100 communicates with the sensor 432 to acquire the data from the sensor 432. The vehicle 10 may then display the data on the operator interface 48 and/or transmit the data to the remote systems 240 along with data/information regarding the vehicle 10 (e.g., a position of the vehicle, a speed of the vehicle, a vehicle status, vehicle slippage indicative of conditions, etc.).

The sprinkler 430 may also be communicably coupled to the sensor 432, the vehicle 10, and/or the network 210 and, therefore, the user portal 230, the user device 232, and/or the remote systems 240. In one embodiment, the sprinkler 430 is controlled by the sprinkler controller 600 such that the sprinkler controller 600 receives/acquires the data from the sensor 432 (directly or indirectly) and controls the sprinkler controls 608 based on the data (e.g., actuates the sprinkler, adjusts the flow rate, adjusts the position, etc.). In another embodiment, the vehicle 10 receives/acquires the data from the sensor 430 (e.g., when the vehicle 10 is proximate to the sensor 432, etc.) and the vehicle controller 100 generates and transmits a command to the sprinkler 430. For example, the vehicle 10 may drive over or around the sensor 432 receiving/acquiring data from the sensor 432 and the data may indicate that the water saturation level of the soil in that area is low (e.g., the soil is dry, the soil is in need of additional watering, etc.). The vehicle controller 100 then generates (e.g., calculates, compares the data to a threshold, uses a look-up table, etc.) a command (e.g., a signal, etc.) based on the data (e.g., a command actuating the sprinkler 430 towards the area in which the water saturation level is low, etc.) and transmits the command to the sprinkler controller 600. The sprinkler controller 600 then communicates, via the communication interface 606, the command to the sprinkler controls 608 positioning the sprinkler 430 towards the area and provides the desired flow of water.

Similarly, the sensor 432 may provide the data regarding the water saturation level to the remote systems 240 in which a user (e.g., a remote user, a remote groundskeeper, etc.) may receive the data and manually determine and input a command adjusting the watering scheme of the sprinkler 430 based on the data. For example, the remote groundskeeper may receive the data via one of the communications interface 256 or the communications interface 266 and determine based on a calculation or a comparison of the data to a look up table, a command to transmit to the sprinkler 430 (e.g., providing more or less water to an area, etc.). The remote groundskeeper may also determine an output (e.g., a description, a warning, a golf hole rating, etc.) to provide to the user device 232 based on the data. For example, the remote groundskeeper can provide a warning to a golfer to avoid an overly saturated area (e.g., avoid driving a golfcart in the overly saturated are, etc.) to prevent further damage to the grass in the overly saturated area. Similarly, an operator, such as a remote caddy, can also provide a description (e.g., an input, etc.) to the user device 232 based on the data to inform a golfer on the playability of the golf hole 400, specifically the playability and/or speed of the green 406. The input from the remote caddy may be a numeric value with an informative scale, a textual description, and/or a comparison between recent conditions (e.g., a previous day's conditions, etc.) on the golf hole 400. In some embodiments, the remote systems 240 are configured to control the irrigation system 402 automatically based on the data acquired by the sensor 432.

The vehicle 10 is also communicably coupled to the sprinkler 430 such that the vehicle 10 can transmit a signal indicative of a location of the vehicle 10 relative to the sprinkler 430. For example, if the sprinkler 430 is currently in use (e.g., popped up above the surface of the soil, providing water, etc.), the vehicle 10 can transmit a command to the sprinkler 430 commanding the sprinkler controls 608 to lower the sprinkler 430 to be flush with the surface or underground. As the vehicle 10 approaches the sprinkler 430, the sensors 90 of the vehicle 10 communicate with (e.g., send or receive signals, etc.) the sensor 618 of the sprinkler 430. Once the vehicle 10 crosses a threshold distance (e.g., comes within a set radius of the sprinkler 430, etc.), the sensors 90 of the vehicle 10 transmit a command to the communication interface 606 of the sprinkler 430 commanding the sprinkler 430 be positioned flush with the surface of the soil or for the sprinkler 430 to stop spraying water (so as not to spray the vehicle 10 and its occupants). Once the vehicle 10 has moved out of the preset threshold distance from the sprinkler 430, the sprinkler 430 may return to normal use and be actuated such that the sprinkler 430 protrudes above the surface of the soil.

Figure 7:
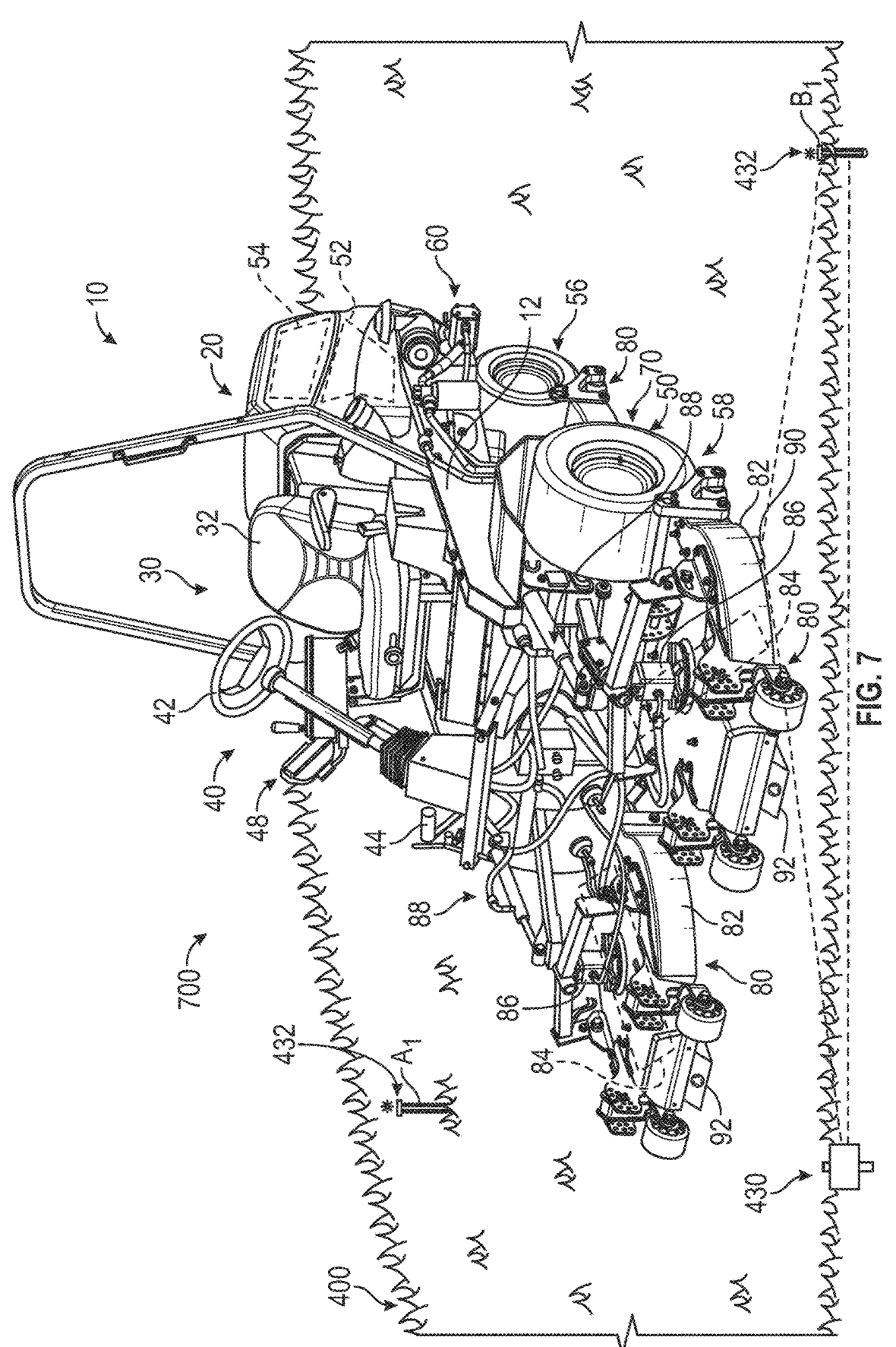
FIG. 7 is a perspective view of the irrigation system and the golf course condition reporting system of FIG. 6 including the vehicle of FIG. 1, according to an exemplary embodiment.

Now referring to FIG. 7, the golf course condition reporting system 700 on the golf hole 400 of FIG. 4 is shown, according to an embodiment. As shown in FIG. 7, the vehicle 10 is a mower. The vehicle 10 is simultaneously mowing and surveying (e.g., via the cameras 92 and the sensors 90, etc.) the golf hole 400. The sensor 432 and the sprinkler 430 are each positioned underground such that neither the sensor 432 nor the sprinkler 430 protrude above the ground or interfere with the vehicle 10.

As the vehicle 10 approaches each of the sprinkler 430 and the sensor 432, the vehicle 10 receives information from the sprinkler 430 and/or the tensiometer 432. The sensor 432 provides information and/or data regarding the saturation level of the water in the area, and the sprinkler 430 provides information regarding a status of the sprinkler 430 (e.g., in use, not in use, etc.). In some embodiments, as the vehicle 10 approaches the sensor 432, the sensor 432 provides the information and/or data to the vehicle 10 and the vehicle 10 then provides the information to the sprinkler 430. The sprinkler controller 600 then determines an action (e.g., turning the sprinkler 430 on, repositioning the sprinkler 430, etc.) based on the received data from the sensor 432 via the vehicle 10. In other embodiments, the vehicle 10 receives the information and/or data from the sensor 432 and the vehicle controller 100 determines a command (e.g., a signal indicative of the action, etc.) to transmit to the sprinkler controller 600.

In some embodiment, the vehicle 10 utilizes the cameras 92 (e.g., machine vision) and/or the sensors 90 to acquire data regarding the water saturation levels of the soil as the vehicle 10 drives along. The vehicle controller 100 may analyze such data or transmit such data to the remote systems 240 to perform the various functions described herein. The vehicle 10 may also be configured to transmit visual data acquired by the imager 620 to the remote systems 240. As such, the remote systems 240 may receive visual data from the sprinkler 430 and data regarding the water saturation level of the soil from the sensors 432 via the vehicle 10. A remote user, such as a remote groundskeeper, can then evaluate and compare the visual data and the data from the sensor 432 and input a command to transmit to the sprinkler 430. For example, if data regarding the water saturation level of the soil from the sensor 432 indicates very high saturation levels (e.g., very wet conditions, etc.), the remote groundskeeper can evaluate the visual data to determine if standing water is present in the area corresponding to the sensor 432. The remote groundskeeper can then provide a command to the sprinkler 430 to stop watering the area and/or reposition the sprinkler 430 such that the sprinkler 430 provides water to a different area of the golf hole 400.

Further, a remote caddy can utilize the visual data from the imager 620 and the data regarding the water saturation level of the soil from the sensor 432 to output a golf hole rating and/or conditions to the user device 232 and/or operator interface 48 used by a golfer. For example, the remote caddy can input a textual description of standing water or pace of the greens (e.g., speed, wetness, etc.), provide a numerical rating of the green 406 relative to a predetermined scale, and/or provide a comparative description of the conditions of the green 406 relative to previous conditions (e.g., current afternoon conditions relative to morning conditions, conditions relative to previous golf holes, conditions relative to the same hole on a previous day, etc.).

Figure 8:
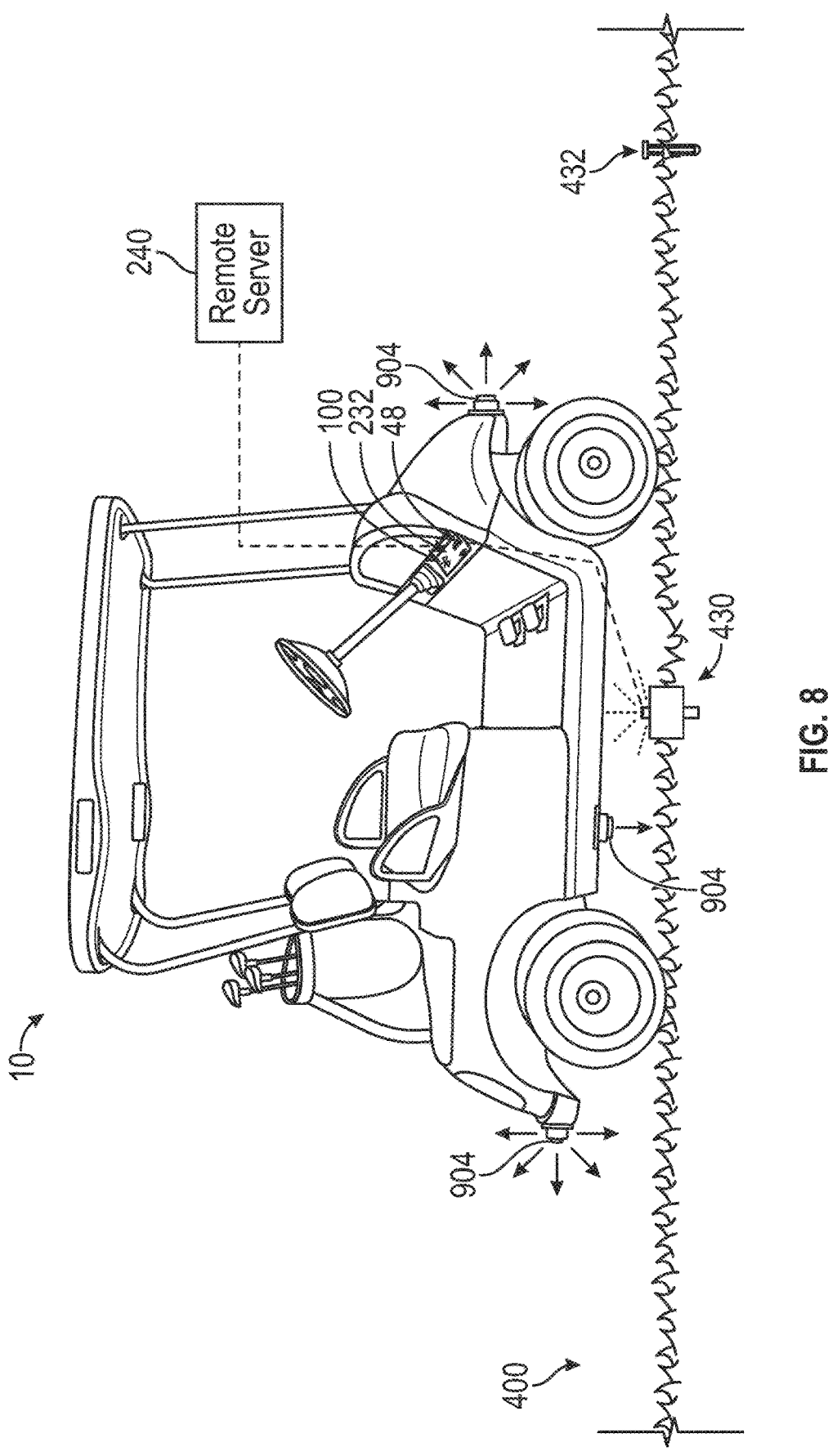
FIG. 8 is a perspective view of the irrigation system and the golf course condition reporting system of FIG. 6 including a vehicle, according to another embodiment.

Now referring to FIG. 8, the golf course condition reporting system 700 is shown according to another embodiment. According to this embodiment, the golf course condition reporting system 700 includes the vehicle 10 that is configured as golf cart. The vehicle 10 is communicably coupled to the sensor 432, the sprinkler 430, and the remote systems 240. In this embodiment, the vehicle 902 includes the user device 232 and/or operator interface 48. As shown in FIG. 8, the user device 232 and/or operator interface 48 is as a built-in display (e.g., a touchscreen display, etc.). In other embodiments, the user device 232 and/or the user device 48 includes a display and is removable coupled to the vehicle 10 (e.g., strapped onto, etc.) and/or a handheld device.

As the vehicle 10 approaches the sensor 432 and the sprinkler 430, at least one of or both of the sensor 432 and the sprinkler 430 transmit information and/or data to the user device 232 and/or operator interface 48 positioned on the vehicle 10. For example, when the vehicle 10 is within a predefined radius of the sensor 432 (e.g., for a set amount of time, stopped within the radius for 30 seconds or more, etc.), the sensor 432 may be configured to determine a current water saturation level of the area and transmit the current water saturation level of the area to the user device 232 and/or the user interface 48. For example, when the vehicle 10 is within 20 yards of the green 406, the sensors 432 located on the green 406 can transmit current conditions to the user device 232 and/or the user interface 48 such that the user can be notified of the conditions of the green 406 prior to chipping onto the green 406 or putting on the green 406.

Once the golfer has finished playing the golf hole 400, the golfer can input current conditions into the user device 232 and/or the operator interface 48. For example, the golfer can input a textual input such as "green is wet, ball traveled slower than anticipated." The user device 232 and/or the operator interface 48 can then transmit the user input to the remote systems 240. The remote systems 240 can then transmit the user input to other user device 232 and/or the operator interface 48 located on other vehicles 10 so that other golfers may read the user input.

The sprinkler 430 is also communicably coupled to the vehicle 10. For example, if the sprinkler 430 is currently in use (e.g., popped up above the surface of the soil, providing water, etc.), the vehicle 10 can transmit a command to the sprinkler 430 commanding the sprinkler controls 608 to lower the sprinkler 430 to be flush with the surface or underground. Once the vehicle 10 has moved out of the preset threshold distance from the sprinkler 430, the sprinkler 430 may return to normal use and be actuated such that the sprinkler 430 protrudes above the surface of the soil.

As shown in FIG. 8, the vehicle 10 may also includes cameras 904 that survey the golf hole 400 and provide visual data to the remote systems 240 (e.g., to detect standing water).

Exemplary Graphical User Interface for a Golf Course Condition Reporting System

Figure 9:
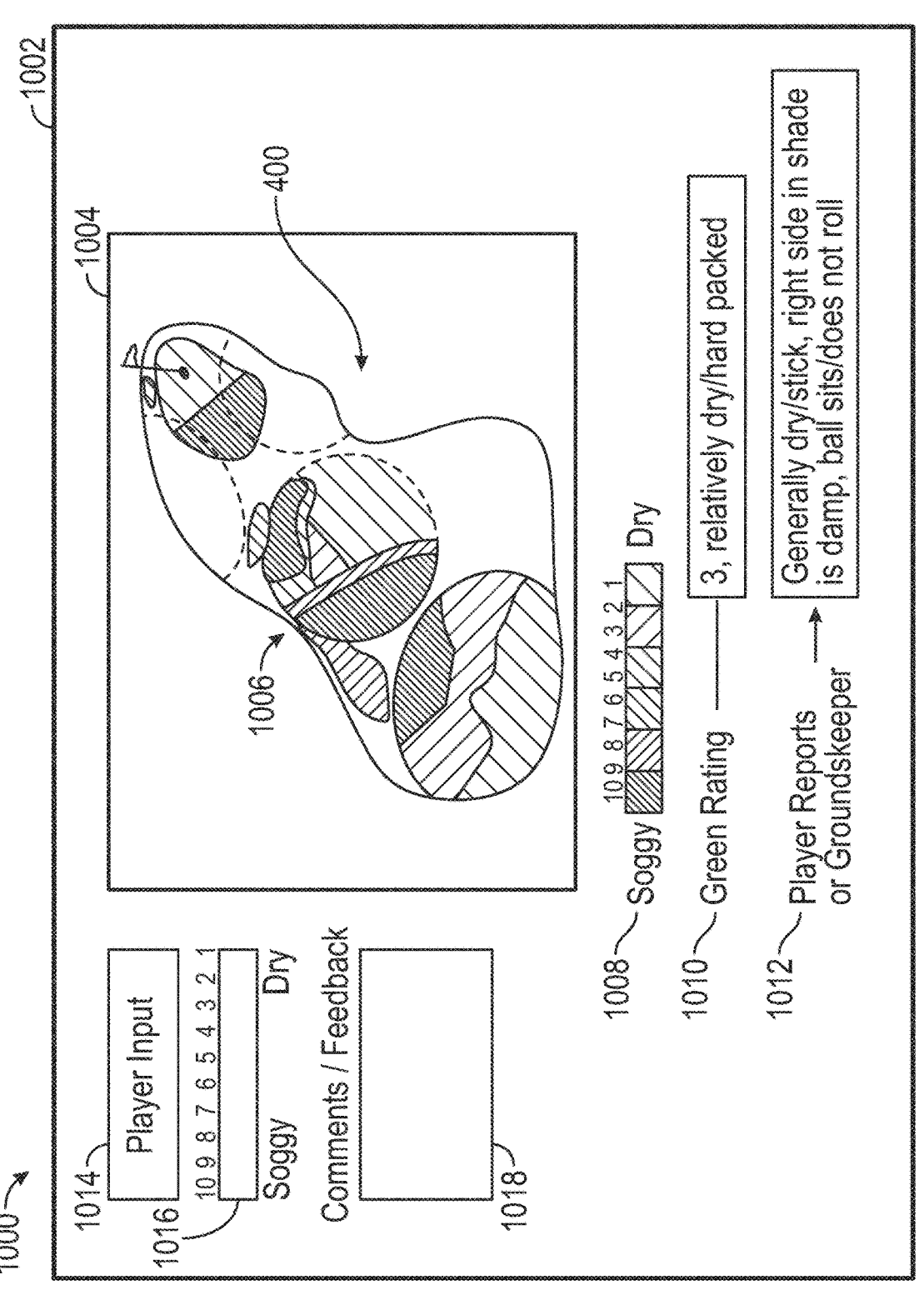
FIG. 9 show a graphical user interfaces generated by a remote systems in communication with the vehicle of FIG. 1 or FIG. 8, according to an exemplary embodiments.

FIG. 9 illustrates a GUI 1000 on a display 1002 of the user device 232 and/or the operator interface 48. The GUI 1000 is generated by the golf course condition reporting system 700 based the data received from the sensors 432, the sprinklers 432, and/or the vehicles 10. The GUI 1000 includes a hole view 1004 illustrating the golf hole 400. The hole view 1004 includes a heat map 1006 and a heat map legend 1008. The heat map 1006 is generated based on the data received from the sensors 432, the sprinklers 430, and/or the vehicles 10. For example, the darker colors/dense shading on the heat map 1006 indicates "soggier" or "more wet" conditions on the golf hole 400 based on the heat map legend 1008.

The GUI 1000 also includes a green rating 1010. The green rating 1010 is also based on the data acquired by the sensors 432. In some embodiments, the green rating 1010 is based on each of the data acquired by the sensor 432 and the visual data acquired by the vehicle 10 and/or the sprinklers 432. The green rating 1010 can be a numerical value and/or a textual description. The numerical value of the green rating 1010 may be a value assigned based on a preset scale of water saturation levels acquired by the sensor 432.

The GUI 1000 also includes a player (or groundskeeper) report 1012. The player report 1012 may be a textual description of the conditions of the golf hole 400 based on feedback from a player or a groundskeeper and/or visual data provided by the vehicles 10.

The GUI 1000 also includes a player input section 1014. The player input section 1014 includes a sliding scale input 1016 that user may toggle and/or drag to input the current sogginess or drying of the green 406. The player input section 1014 also includes a comment input section 1018 for receiving a textual input from the user (e.g., the golfer, etc.). The input in the comment input section 1018 may be transmitted to the remote systems 240. The remote systems 240 can then transmit the input in the comment input section 1018 to other user devices 232 and/or the user interfaces 48 on other vehicles 10 for other users/golfers to see.

The GUI 1000 may be a first GUI and can be updated continuously throughout the day. For example, as the vehicle 10 approaches a hole, a new/updated GUI 1000 may be generated based on the most current data and feedback available. In some embodiments, the GUI 1000 is configured to facilitate viewing the hole 400 at various different points in time. Such different views may be accessible by a user so that the user can view water saturation levels over time for the hole 400. Accordingly, a golfer could see the water saturation levels when they played the hole 400 last such that they can use that information to inform their lines and play at the current point in time.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the vehicle controller 100, etc.) as shown in the various exemplary embodiments is illustrative only. Additionally, any element disclosed in one embodiment may be incorporated or utilized with any other embodiment disclosed herein.

The invention claimed is:

1. An irrigation system comprising:
   at least one sensor configured to acquire data regarding (a) a first water saturation level of a first portion of an area of soil and (b) a second water saturation level of a second portion of the area of soil;
   a sprinkler system configured to provide water to the area of soil; and
   a control system configured to:
      acquire one or more predetermined water saturation thresholds to provide one or more desired water saturation levels to the area of soil;
      acquire the data from the at least one sensor; and control the sprinkler system to differentially water the first portion and the second portion based on the data and the one or more predetermined water saturation thresholds to provide the one or more desired water saturation levels to the first portion and the second portion.

2. The irrigation system of claim 1, wherein the sprinkler system includes a first sprinkler associated with the first portion and a second sprinkler associated with the second portion, and wherein differentially watering the first portion and the second portion includes causing (a) the first sprinkler to stop watering the first portion when the first water saturation level is detected to have reached the one or more predetermined water saturation thresholds associated the first portion and (b) the second sprinkler to stop watering the second portion when the second water saturation level is detected to have reached the one or more predetermined water saturation thresholds associated the first portion.

3. The irrigation system of claim 1, wherein the control system is configured to control the sprinkler system to start watering or continue watering the first portion or the second portion in response to the first water saturation level or the second water saturation level, respectively, being less than the one or more predetermined water saturation thresholds.

4. The irrigation system of claim 1, wherein the control system is configured to control the sprinkler system to stop watering the first portion or the second portion in response to the first water saturation level or the second water saturation level, respectively, being greater than or equal to the one or more predetermined water saturation thresholds.

5. The irrigation system of claim 1, wherein the sprinkler system includes a respective sprinkler configured to differentially water both the first portion and the second portion.

6. The irrigation system of claim 1, wherein the at least one sensor and the control system communicate wirelessly.

7. The irrigation system of claim 1, wherein the at least one sensor includes a tensiometer configured to be disposed within the soil of the area.

8. The irrigation system of claim 1, wherein the at least one sensor includes a vehicle sensor configured to be positioned on a vehicle.

9. The irrigation system of claim 8, wherein the vehicle sensor includes a camera configured to survey the area as the vehicle drives over or proximate the area.

10. The irrigation system of claim 8, wherein the vehicle sensor is a speed sensor, wherein the data is speed data regarding a component of the vehicle, and wherein the control system is configured to determine the first water saturation level and the second water saturation level based on the speed of the component of the vehicle.

11. The irrigation system of claim 10, wherein the vehicle is a mower, and wherein the component includes mower blades.

12. The irrigation system of claim 1, wherein the control system includes at least one processing circuit positioned in a vehicle, and wherein the at least one processing circuit is configured to acquire the data from the at least one sensor when the vehicle is within a threshold distance of the at least one sensor.

13. The irrigation system of claim 1, wherein the control system includes at least one processing circuit positioned at a server.

14. The irrigation system of claim 1, wherein the control system includes at least one processing circuit that is part of the sprinkler system.

15. The irrigation system of claim 1, wherein the sprinkler system includes a first sprinkler and a second sprinkler, wherein the first sprinkler is configured to transmit a command to the second sprinkler.

16. An irrigation system comprising:
a non-transitory computer-readable medium having instructions stored thereon that, upon execution by one or more processors, cause the one or more processors to:
acquire one or more predetermined water saturation thresholds to provide one or more desired water saturation levels to an area of soil;
acquire data regarding (a) a first water saturation level of a first portion of the area of soil from a first sensor and (b) a second water saturation level of a second portion of the area of soil from a second sensor; and
control one or more sprinklers to differentially water the first portion and the second portion based on the data and the one or more predetermined water saturation thresholds to provide the one or more desired water saturation levels to the first portion and the second portion.

17. The irrigation system of claim 16, wherein the instructions cause the one or more processors to
generate a graphical user interface based on the data for display to a user on a display device.

18. The irrigation system of claim 16, wherein, to control the sprinklers to provide the one or more desired water saturation levels to the area of soil, the instructions cause the one or more processors to:
transmit a first command to a first sprinkler of the one or more sprinklers corresponding to the first portion of the area; and
transmit a second command to a second sprinkler of the one or more sprinklers corresponding to the second portion of the area.

19. An irrigation system comprising:
a non-transitory computer-readable medium having instructions stored thereon that, upon execution by one or more processors, cause the one or more processors to:
acquire at least one predetermined water saturation threshold to provide a desired water saturation level to a plurality of areas;
acquire a plurality of first signals regarding first water saturation values corresponding to the plurality of areas;
generate at least one first command based on the first water saturation values relative to the at least one predetermined water saturation threshold;
transmit the at least one first command to at least one sprinkler of a plurality of sprinklers;
acquire a plurality of second signals regarding second water saturation values corresponding to the plurality of areas;
generate at least one second command based on the second water saturation values relative to the at least one predetermined water saturation threshold;
transmit the at least one second command to at least one sprinkler of the plurality of sprinklers; and
dynamically generate a graphical user interface based on the first water saturation values and the second water saturation values.

20. The irrigation system of claim 19, wherein the at least one first command causes a control system to turn on at least one sprinkler of the plurality of sprinklers and the at least one second command causes the control system to at least one of turn off or rotate at least one sprinkler of the plurality of sprinklers.

* * * * *